Aug. 14, 1951
H. W. HAPMAN
2,564,599
SELF-SEALING CONVEYER CONSTRUCTION
Filed March 18, 1947
2 Sheets—Sheet 1
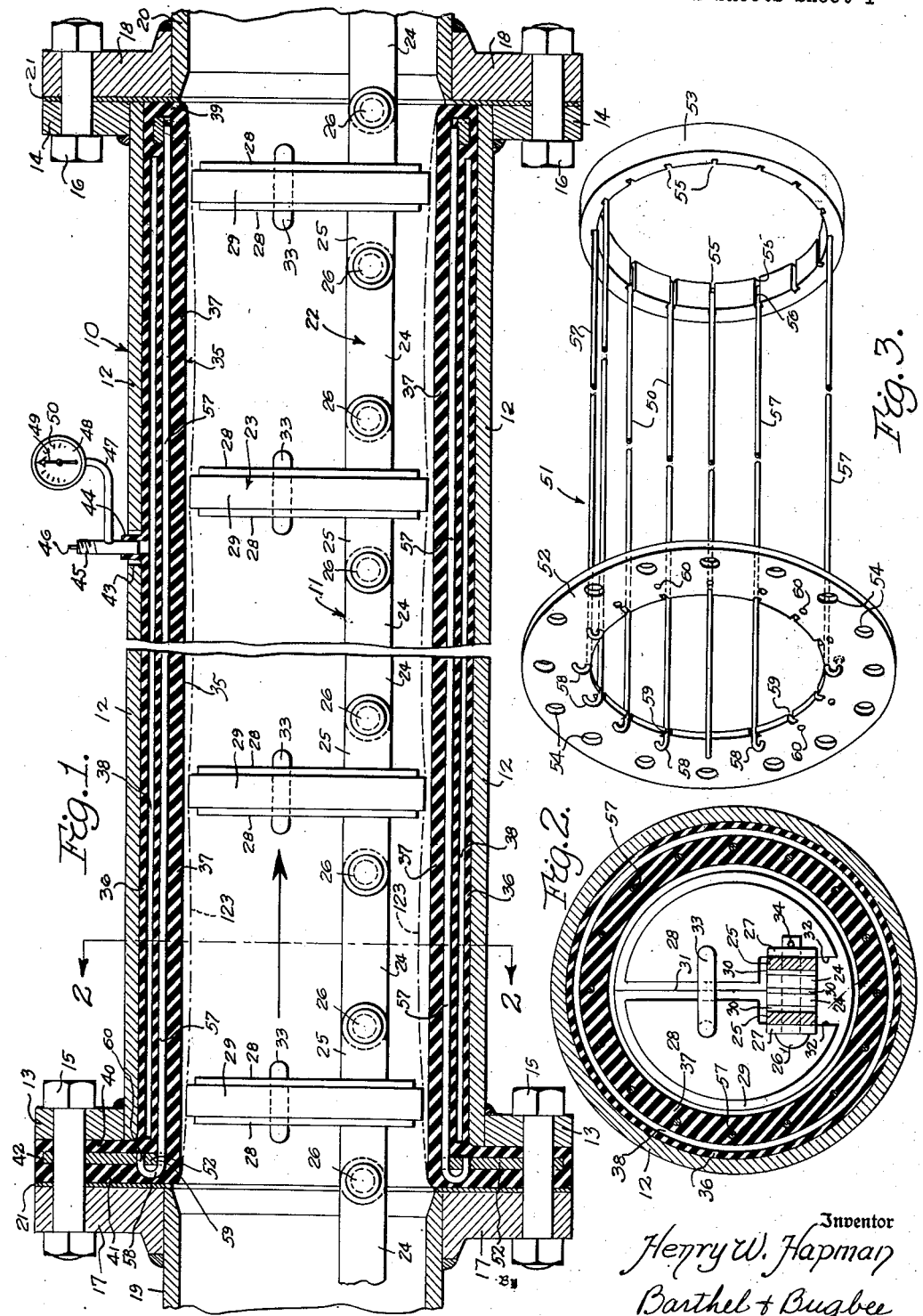
Inventor
Henry W. Hapman
Barthel & Bugbee
Attorneys Aug. 14, 1951           H. W. HAPMAN           2,564,599
SELF-SEALING CONVEYER CONSTRUCTION
Filed March 18, 1947           2 Sheets-Sheet 2
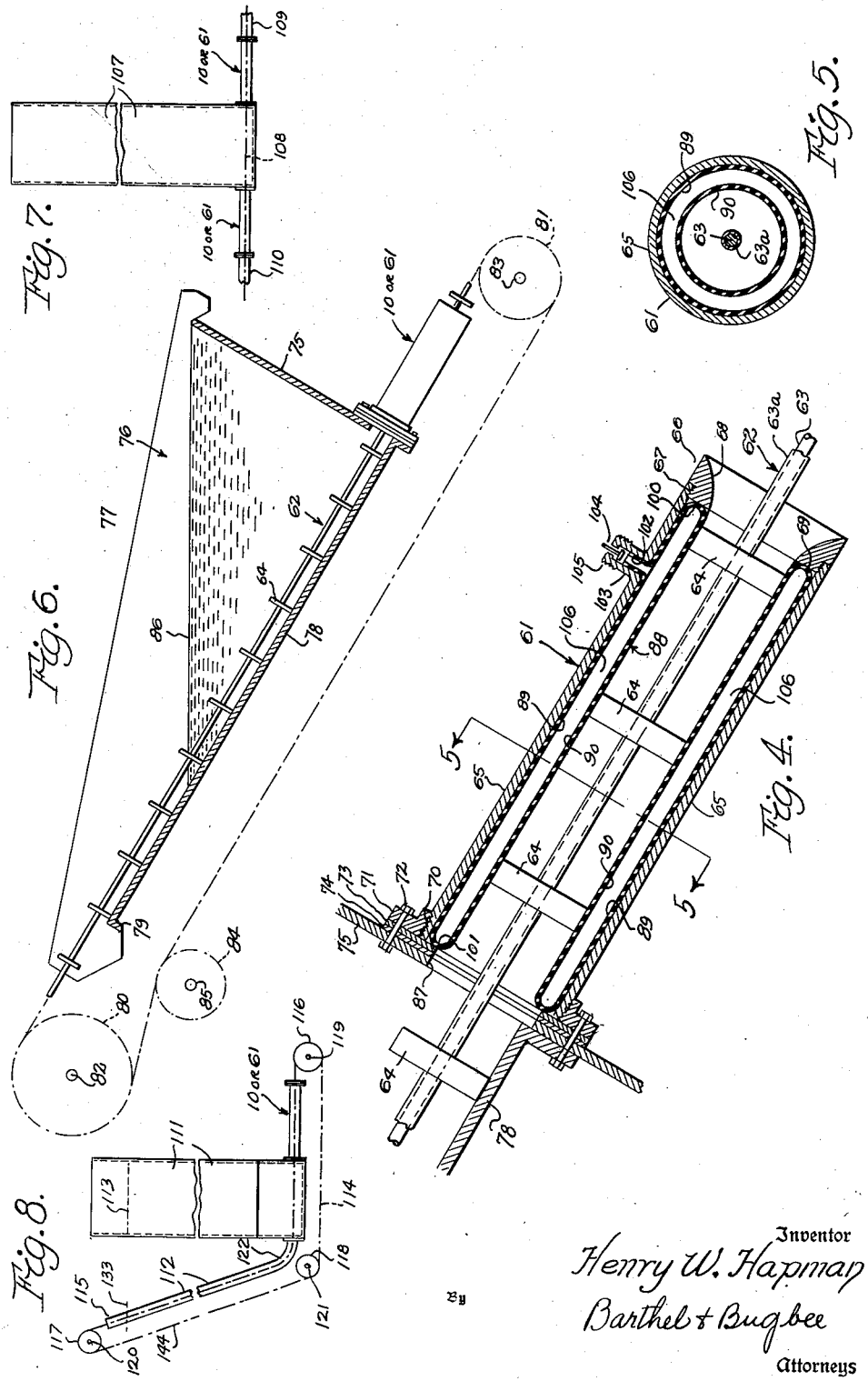
Inventor
Henry W. Hapman
Barthel & Bugbee
Attorneys Patented Aug. 14, 1951

2,564,599

UNITED STATES PATENT OFFICE 2,564,599

SELF-SEALING CONVEYER CONSTRUCTION

Henry W. Hapman, Detroit, Mich., assignor, by mesne assignments, of forty per cent to Hannah J. Hapman Application March 18, 1947, Serial No. 735,401

9 Claims. (Cl. 198—168)

This invention relates to sealing devices and in particular to devices for sealing conveying or feeding mechanisms which move in a linear path into or out of tanks, containers or compartments, as distinguished from the sealing of rotating mechanisms, such as shafts or wheels.

One object of this invention is to provide a sealing device for a linearly-moving conveying or feeding mechanism such as a conveyor or a reciprocating feeder, so arranged that the mechanism may pass into or out of a compartment under pressure or vacuum, or containing dust or vapor, without releasing any substantial amount thereof.

Another object is to provide a sealing device for a linearly-moving conveying or feeding mechanism, such as a flight conveyor, which consists of a tubular member of elastic deformable material such as rubber or synthetic rubber, subjected to fluid pressure so that it closely hugs the flights of the conveyor or the piston head of a reciprocating feeder and prevents leakage either into or out of a compartment which the conveyor or feeder enters or leaves.

Another object is to provide a sealing device, as set forth in the preceding objects, wherein the conveyor or feeder may operate continuously to convey material into or out of a compartment without leakage and without requiring the unloading of the compartment or container, nor interrupting the operation thereof.

Another object is to provide a sealing device, as set forth in the preceding objects, for a conveyor arranged for the removal of dust from dust-collectors or sludge from high tanks, without having to shut down the dust collector or pump the liquid out of the tank.

Another object is to provide a sealing device, as set forth in the preceding objects, for a conveyor or feeder arranged for the feeding of material into a compartment under pressure without danger of the material being blown back by the pressure in the compartment, for example, the feeding of pulverized coal to the pressurized firebox of a boiler without undergoing any substantial blow back of the coal.

In the drawings:

Figure 1 is a central longitudinal section through a sealing device for a linearly-moving mechanism consisting of a chain-mounted flight conveyor, according to a preferred form of the invention, with the sealing pressure relaxed;

Figure 2 is a cross-section through the device shown in Figure 1, taken along the line 2—2 therein;

Figure 3 is a perspective view of the reinforcing frame for the sealing tube of the sealing device shown in Figures 1 and 2;

Figure 4 is a central longitudinal section through a slightly modified sealing device, as employed with a table-mounted flight conveyor;

Figure 5 is a cross-section through the sealing device of Figure 4, taken along the line 5—5 therein;

Figure 6 is a side elevation, partly in vertical section, of a typical installation, such as an inclined sludge tank, employing the sealing device and flight conveyor shown in Figures 1 or 4;

Figure 7 is a diagrammatic side elevation of another typical installation, such as a vertical sludge tank, employing the sealing device and flight conveyor shown in Figures 1 or 4, wherein the conveyor is sealed both where it enters and emerges from the bottom of the tank; and Figure 8 is a diagrammatic side elevation of a vertical tank, similar to Figure 7, but showing an installation wherein the conveyor is sealed only at the point where it enters the tank and passes through an upwardly-inclined conduit after emerging from the tank.

Hitherto, the removal of sludge or other deposited matter from tanks, containers or compartments under pressure or under vacuum has presented serious problems, especially when it is desired to maintain the machinery in continuous service without interruption of its operation. In removing the dust from dust collectors operating under pressure, it has hitherto been necessary to shut down the dust collector in order to remove the dust from it unless gates are provided. In feeding pulverized coal to a boiler firebox which is under pressure, the back pressure has blown the coal back in the direction from which it came, rendering such installations dirty and inefficient. In removing sludge from the bottom of a high tank, such as an oil tank, it has hitherto been necessary to pump out the oil periodically and then enter the tank and clean it out, thereby subjecting the workman to a dirty and unhealthy task.

The present invention overcomes these difficulties by providing a sealing device through which the conveyor or feeder moves upon entering and/or leaving the tank, container or compartment. Accordingly, when the invention is applied to a dust collector operating under pressure, the dust can be removed either continuously or intermittently without halting the operation of the dust collector and without the escape of any considerable quantity of dust into the atmosphere. The present invention also enables pulverized coal to be fed continuously to the pressurized firebox of a boiler without resulting in any blow back of the coal, thereby insuring completely successful operation of the type of pulverized coal burner which burns the coal and immediately fuses all of the ash therefrom. In removing sludge from the bottom of a high tank full of liquid, such as oil, the present invention enables a conveyor to enter and leave the bottom of the tank and at the same time to be completely sealed against the pressure arising from the head of liquid in the tank without loss of any substantial portion of the contents of the tank and without requiring the tank to be emptied in order for cleaning to be carried out. In an analogous manner, the present invention may also be used to seal the entrance and/or exit of a conveyor or reciprocating feeder which passes through a tank, container or compartment which is under subatmospheric pressure or vacuum.

Referring to the drawings in detail, Figures 1 and 2 show a sealing device, generally designated 10, according to a preferred form of the invention as employed to seal a linearly-moving mechanism such as a chain-mounted flight conveyor, generally designated 11. The sealing device 10 is housed in a tubular housing 12 having connection flanges 13 and 14 which are either integral with the tubular housing 12 or are secured thereto as by welding. The flanges 13 and 14 are bolted as at 15 and 16 to the flanges 17 and 18 of adjacent conduits 19 and 20 respectively, between which the sealing device 10 serves to seal the conveyor 11. Gaskets 21 of any conventional type are employed between the flanges 13 and 17 or 14 and 18.

The linearly-moving mechanism 11 which the sealing device 10 seals during its passage from the conduit 19 to the conduit 20 or vice versa, may consist either of a conveyor moving in one direction or a plunger moving in a reciprocating path for feeding or pumping materials. For convenience of illustration, the linearly-moving mechanism 11 of Figure 1 has been illustrated as embodying a chain-mounted flight conveyor having a chain generally designated 22 carrying spaced flight units generally designated 23. The chain 22 consists of spaced pairs of inner links 24 which at their opposite ends are pivotally connected to spaced outer links 25 (Figure 2) by means of pivot pins 26 which likewise pass through ears 27 projecting at right angles from approximately semi-circular clamping plates 28 mounted on opposite sides of disc-like flights 29 of elastic deformable material such as rubber or synthetic rubber.

The inner and outer links 24 and 25 are spaced apart from each other and sealed against the entrance of dust or foreign matter by means of resilient washers 30 (Figure 2) of elastic deformable material, such as rubber or synthetic rubber. The inner links 24 pass through suitable apertures (not shown) in the flights 29 which are optionally split along a portion of the diameter as at 31 to facilitate insertion of the links 24 in these apertures. The clamping plates 28 are also formed as right-hand or left-hand units and are provided with oppositely-facing cutaway portions 32 for the reception of the links 24 and 25 and the formation of the ears 27. The flights 29 and clamping plates 28 are held together in assembly by tie members 33 passing therethrough. The pivot pins 26 are held in assembly by cotter pins 34 or other equivalent devices mounted in the ends opposite their heads (Figure 2).

The sealing device 10 includes a double-walled tubular member generally designated 35 of elastic deformable material such as rubber or synthetic rubber having a relatively thin outer wall 36 and a relatively thick inner wall 37 separated by an annular air space or air chamber 38. The outer and inner walls 36 and 37 are joined at one end by a connecting wall 39 and at the other end by spaced end walls 40 and 41 (Figure 1) interconnected by an annular wall 42. The walls 40, 41 and 42 in effect form end flanges which are held between the casing and conduit flanges 13 and 17 by the bolts 15. The casing 12 is provided at 43 with an opening through which emerges a tubular portion 44 projecting from the outer wall 36 and leading into the air chamber 38. A filling connection and valve 45 with a valve stem 46 therein serves for the attachment of a compressed air hose for filling the chamber 38 with compressed air, a branch pipe 47 leading to a pressure gauge 48, the needle 49 of which indicates the pressure in the air chamber 38 by means of a graduated dial 50 (Figure 1).

In order to reinforce the inner wall 37 and prevent it from piling up, wrinkling or undulating during the passage of the conveyor 11 therethrough, the double-walled tubular member 35 includes a reinforcing structure generally designated 51 and shown isometrically in Figure 3, certain of the reinforcing rods therein being omitted to avoid concealing the rods lying behind them. The reinforcing structure consists of a pair of spaced annular members or heads 52 and 53, the former extending radially outward a greater distance than the latter and provided with circumferentially-spaced holes 54 for the passage of the bolts 15. The annular members 53 on their internal walls are provided with circumferentially-spaced longitudinal grooves or notches 55 for the reception of the straight ends 56 of longitudinal reinforcing rods 57 of spring steel or the like. The opposite ends 58 of the rods 57 are curved or hooked, and pass through circumferentially-spaced internal notches 59 in the head 52 and their tips are lodged in circumferentially-spaced holes 60 aligned radially with the notches 59 (Figure 3).

From an examination of Figures 1 and 2 it will be seen that the tubular member 35 is molded over the reinforcing structure 51 in such a way that the reinforcing rods 57 lie within the inner wall 37. The right-hand end wall 39 is molded around the head or annular member 53 whereas the left-hand end flanges 40 and 41 and the connecting portion 42 are molded around the head or annular member 52.

The modified sealing device generally designated 61 shown in Figure 4 is a simplification of the sealing device 10 shown in Figures 1 and 2 and lacks the reinforcing structure 51 shown in Figure 3. It is also shown as sealing a cable-mounted flight conveyor, generally designated 62, although the chain-mounted flight-conveyor 11 of Figure 1 or a reciprocating piston feeder (not shown) might also be employed. The flight conveyor 62 consists of a flexible cable 63 upon which disc-like flights 64 are mounted at spaced intervals. The flexible cable 63 is optionally provided with a tubular coating 63a of rubber-like material to protect it from corrosion or wear. The flight conveyor 62 is conventional and its details form no part of the present invention, as several different types of conveyor may be used.

The simplified sealing device 61 includes a tubular casing 65 having an annular inlet member 66 threaded as at 67 into one end of the casing 61. The inlet member 66 is provided with a funnel-shaped or bell-mounted inlet 68 terminating in an internal end wall 69.

Threaded as at 70 upon the opposite end of the casing 65 is a flange 71 which is bolted as at 72 through annular gaskets 73 and 74 to the end wall 75 of an inclined sludge tank generally designated 76 (Figure 6). The tank 76 has side walls 77 and an inclined bottom wall 78 with a lip 79 at the top thereof for the discharge of the sludge carried upward along the bottom wall 78 by the flight conveyor 62. The latter passes over grooved wheels 80 and 81 mounted on shafts 82 and 83 respectively at the opposite ends thereof and is maintained in a taut condition by means of an adjusting wheel 84 mounted on an adjustable shaft 85. The tank 76 contains a sludge bearing liquid 86, the sludge from which settles to the bottom and is withdrawn by the upwardly-moving flight conveyor 62, and dumped over the lip 79 into a suitable receiver.

In order to seal the flights 64 of the flight conveyor 62, as they enter the tank 76 through the hole 87 in the end wall 75 thereof (Figure 4), a double-walled tubular member 88 is mounted inside the tubular housing 65 and has outer and inner walls 89 and 90 respectively joined by end walls 100 and 101 respectively. The end wall 100 abuts the end surface 69 of the inlet member 66 whereas the end wall 101 abuts the inner surface of the annular gasket 73. The outer wall 89 is provided with an outwardly projecting tubular portion 102 which projects through the bore of a corresponding tubular portion 103 of the casing 65. The latter is provided with a valve member 104 and a threaded connection 105 for a compressed air hose by which the annular air chamber 106 between the outer and inner walls 89 and 90 is filled with compressed air.

The installation shown in Figure 7 consists of a vertically elongated tank 107 which contains a sludge bearing liquid or dry material which it is desired to unload from the bottom thereof. For this purpose, two sealing devices 10 or 61 are mounted on opposite sides of the tank 107 adjacent the inlet and exit holes of the flight conveyor indicated diagrammatically by the chain line 108. Conduits 109 and 110 connected to the sealing devices 10 or 61 serve to guide the conveyor 108 and carry away the material conveyed thereby.

The installation shown in Figure 8 also employs a vertical tank 111 similar to the vertical tank 107 and for a similar purpose. In the arrangement shown in Figure 8, however, only one sealing device 10 or 61 is employed, this being mounted at the inlet aperture in the sidewall of the tank 111. An upwardly-curved conduit 112 extends from the outlet aperture in the opposite side wall of the tank 111 up to a point above the liquid level 113 in the tank 111 and consequently also the liquid level in the conduit 112. The flight conveyor 114 passes through the sealing device 10 or 61, thence through the tank 113 and upward through the inclined conduit 112, dumping the sludge conveyed thereby at the top end 115 of the conduit 112. Wheels or sprockets 116, 117 and 118 mounted on shafts 119, 120 and 121 respectively serve to guide the flight conveyor 114 around its course, further guidance being provided by the curved portion 122 of the upwardly-inclined conduit 112.

Operation

In the operation of the invention, either of the sealing device 10 shown in Figure 1 or the simplified sealing device shown in Figure 4, the air chamber 38 or 106 is supplied with compressed air through the connection 45 or 105 until the inner wall 37 or 90 closely hugs the conveyor flights 29 or 64. The chain lines 123 in Figure 1 indicate the approximate position of the inner surface of the inner wall 37 when the air chamber 38 has been filled with compressed air. When the conveyor 11 or 62 is now started in motion along its linear path of travel, it slides along the inner wall 37 or 90 and is effectively sealed by the tight engagement thereof due to the air pressure within the annular air chambers 38 or 106. The cage-like reinforcing structure 51 prevents undue and undesired deformation of the sealing device 10 under heavy duty conditions where the sealing device 61 (Figures 4 and 5) would be unsuitable.

As the flight conveyor 11 or 62 passes into the interior of the tank, container or compartment, such as the tanks 76, 107 or 111 of Figures 6, 7 and 8 respectively, the pressure of the liquid within the tank is effectively counteracted by the pressure of the air within the annular air chamber 38 or 106 so that leakage is effectively prevented. The air pressure within the air chamber 38 or 106 may be increased or decreased as the conditions demand, according to the pressure arising by the head of the liquid in the tank. The action of the conveyor and sealing device in the particular installations shown in Figures 6, 7 and 8 has been described above in connection with the description of the construction thereof.

As previously stated, instead of conveying sludge from the bottom of a tank containing liquid, the invention is equally applicable to sealing off a compartment containing gas under pressure such as a dust-collector or a pressurized firebox to which pulverized coal is being fed by the conveyor. The sealing device of the present invention not only prevents leakage but also because of its construction from elastic deformable material reduces wear, substantially cuts down noise and vibration, and in the presence of a liquid is self-lubricating due to the lubricating action of water upon rubber, or rubber-like materials. Where the sealing device is used in the presence of oil or other chemicals which attack natural rubber, it is preferable to employ a synthetic rubber which is resistant to such deteriorating action.

In Figure 1 the direction of travel of the conveyor is from left to right as indicated by the arrow. When heavy frictional loads develop, they are sustained by the flange structure 13, 17, 40, 41, 52 which is so designed for that purpose.

While the inflatable chambers 38 and 106 have been described as filled with a compressed gas, it will be understood that they may be filled with a liquid where an additional expansion chamber is provided for the liquid to overcome its natural incompressibility. Alternatively, the opposite ends of the chamber may be interconnected by a by-pass conduit since the liquid will tend to move within the sleeve 37 or 90 along with the movements of the flights 23 or 64 of the conveyor.

The above-mentioned expansion chamber may consist of a sack of elastic deformable material, such as rubber, connected to the chamber 38 or 106.

What I claim is:

1. A self-sealing conveyor construction comprising an inflatable elongated conduit having spaced fluid-tight outer and inner walls forming an inflatable chamber therebetween, said inner wall being tubular and of elastic deformable material, an elongated resilient reinforcing structure embedded in said inner wall outwardly of the inner surface thereof, an elongated longitudinally-movable element disposed in said conduit, and an enlarged material-conveying member mounted transversely on said element in peripheral engagement with said inner surface of said inner wall.

2. A self-sealing conveyor construction comprising an inflatable elongated conduit having spaced fluid-tight outer and inner walls forming an inflatable chamber therebetween, said inner wall being tubular and of elastic deformable material, an elongated resilient reinforcing structure comprising an annular framework of longitudinally-extending rods embedded in said inner wall outwardly of the inner surface thereof, an elongated longitudinally-movable element disposed in said conduit, and an enlarged material-conveying member mounted transversely on said element in peripheral engagement with said inner surface of said inner wall.

3. A self-sealing conveyor construction comprising an inflatable elongated conduit having spaced fluid-tight outer and inner walls forming an inflatable chamber therebetween, said inner wall being tubular and of elastic deformable material, an elongated resilient reinforcing structure comprising a pair of spaced annular heads and an annular framework of longitudinally-extending rods embedded in said inner wall outwardly of the inner surface thereof and interconnecting said heads, an elongated longitudinally-movable element disposed in said conduit, and an enlarged material-conveying member mounted transversely on said element in peripheral engagement with said inner surface of said inner wall.

4. A self-sealing conveyor construction comprising an inflatable elongated conduit having spaced fluid-tight outer and inner walls forming an inflatable chamber therebetween, said inner wall being tubular and of elastic deformable material, an elongated resilient reinforcing structure comprising a pair of spaced annular heads and an annular framework of longitudinally-extending rods embedded in said inner wall outwardly of the inner surface thereof and interconnecting said heads, one of said walls having a transversely-extending flange engaging one of said heads, an elongated longitudinally-movable element disposed in said conduit, and an enlarged material-conveying member mounted transversely on said element in peripheral engagement with said inner surface of said inner wall.

5. A self-sealing conveyor construction comprising an elongated fluid-tight casing, an inflatable conduit of elastic deformable material mounted within said casing and having spaced tubular outer and inner walls forming an inflatable chamber therebetween, an elongated longitudinally-movable element disposed in said conduit, and an enlarged material-conveying member mounted transversely on said element in peripheral engagement with said inner wall, said casing having a flanged portion, and said outer and inner walls having an inter-connecting end portion at one end thereof and having flanged portions connected to said casing flanged portion at the other end thereof.

6. A self-sealing conveyor construction comprising an elongated fluid-tight casing, an inflatable conduit of elastic deformable material mounted within said casing and having spaced tubular outer and inner walls forming an inflatable chamber therebetween, an elongated resilient reinforcing structure comprising an annular framework of longitudinally-extending rods embedded in said inner wall outwardly of the inner surface thereof, an elongated longitudinally-movable element disposed in said conduit, and an enlarged material-conveying member mounted transversely on said element in peripheral engagement with said inner surface of said inner wall.

7. A self-sealing conveyor construction comprising an elongated fluid-tight casing, an inflatable conduit of elastic deformable material mounted within said casing and having spaced tubular outer and inner walls forming an inflatable chamber therebetween, an elongated resilient reinforcing structure comprising a pair of spaced annular heads and an annular framework of longitudinally-extending rods embedded in said inner wall outwardly of the inner surface thereof and interconnecting said heads, an elongated longitudinally-movable element disposed in said conduit, and an enlarged material-conveying member mounted transversely on said element in peripheral engagement with said inner surface of said inner wall.

8. A self-sealing conveyor construction comprising an elongated fluid-tight casing, an inflatable conduit of elastic deformable material mounted within said casing and having spaced tubular outer and inner walls forming an inflatable chamber therebetween, an elongated resilient reinforcing structure comprising a pair of spaced annular heads and an annular framework of longitudinally-extending rods interconnecting said heads, and embedded in said inner wall outwardly of the inner surface thereof, one of said walls having an outwardly extending portion engaging one of said heads, an elongated longitudinally-movable element disposed in said conduit, and an enlarged material-conveying member mounted transversely on said element in peripheral engagement with said inner surface of said inner wall.

9. A self-sealing conveyor construction comprising an elongated fluid-tight casing, an inflatable conduit of elastic deformable material mounted within said casing and having spaced tubular outer and inner walls forming an inflatable chamber therebetween, an elongated resilient reinforcing structure comprising a pair of spaced annular heads and an annular framework of longitudinally-extending rods connected to said inner wall and interconnecting said heads, an elongated longitudinally-movable element disposed in said conduit, and an enlarged material-conveying member mounted transversely on said element in peripheral engagement with said inner wall, said casing having a flanged portion and said outer and inner walls having an inter-connecting portion at one end thereof and flanged portions at the other end thereof engaging one of said heads and secured to said casing flanged portion.

HENRY W. HAPMAN.

REFERENCES CITED

The following references are of record in the file of this patent:

UNITED STATES PATENTS

| Number | Name | Date |
|---|---|---|
| 1,048,019 | Wilson | Dec. 24, 1912 |
| 1,554,275 | Good | Sept. 22, 1925 |
| 2,428,995 | Rogers | Oct. 14, 1947 |
| 2,478,326 | Scarth | Aug. 9, 1949 |

FOREIGN PATENTS

| Number | Country | Date |
|---|---|---|
| 834,316 | France | Aug. 16, 1938 |